July 30, 1957  W. E. BOOKER  2,801,130
CATTLE CARRYING ATTACHMENT FOR TRUCKS
Filed May 19, 1954
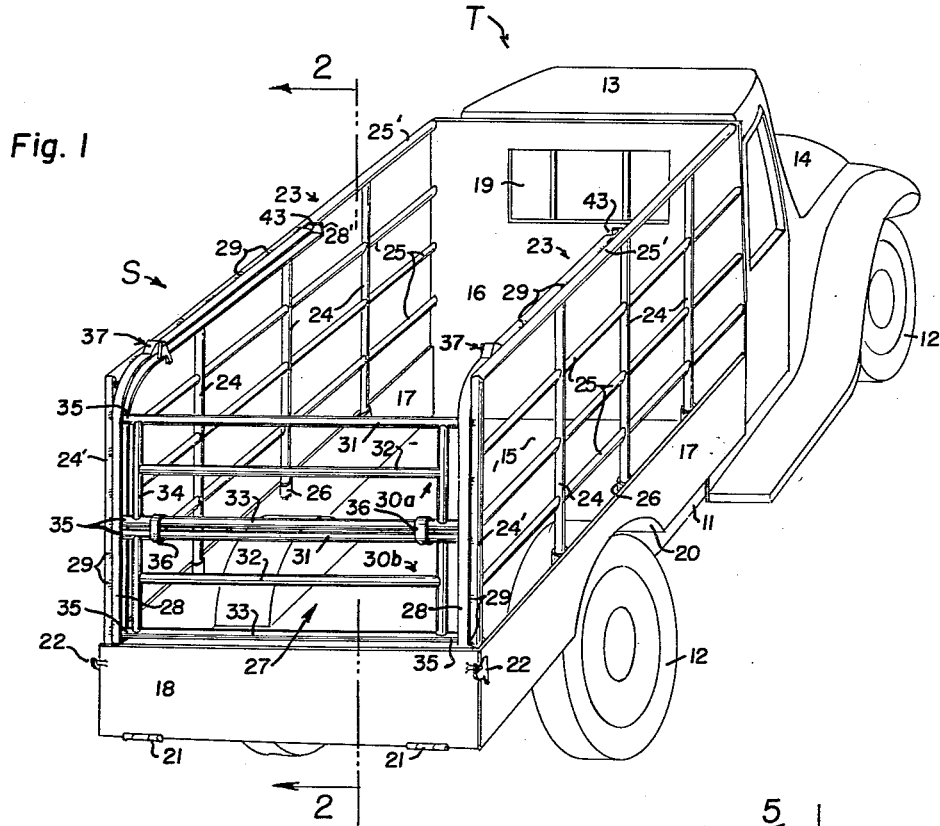
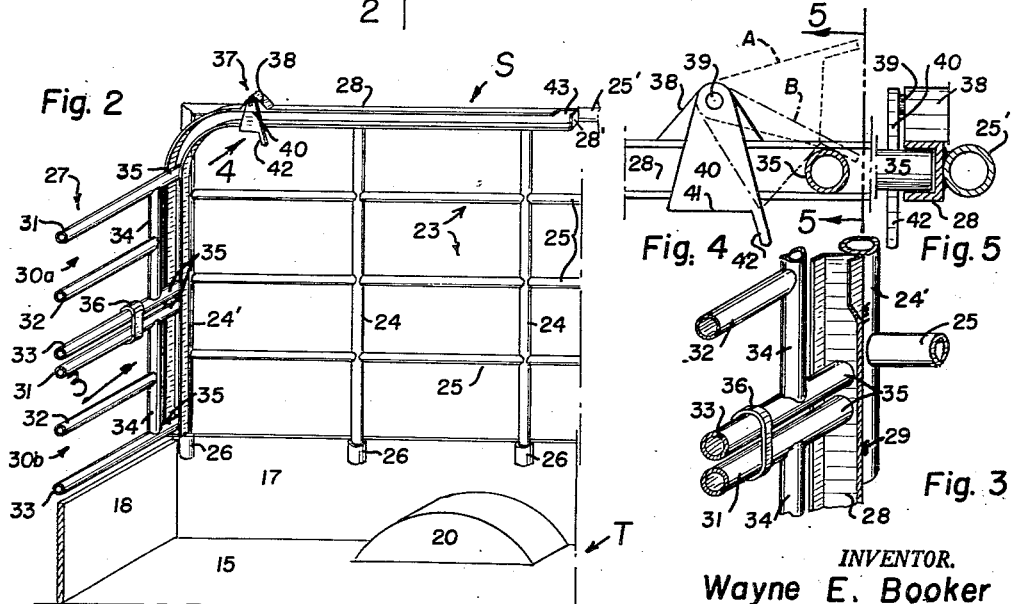
INVENTOR.
Wayne E. Booker
BY WHITEHEAD & VOGL
PER *Earle Whitehead*
ATTORNEYS United States Patent Office 2,801,130
Patented July 30, 1957

2,801,130

CATTLE CARRYING ATTACHMENT FOR TRUCKS

Wayne E. Booker, Calhan, Colo.

Application May 19, 1954, Serial No. 430,905

3 Claims. (Cl. 296—12)

This invention relates to truck body structures for carrying stock, and more particularly to a stock-carrying truck body structure for small pick-up trucks, combining with the relatively flat body of a conventional pick-up truck a novel and improved side wall rack and end gate enclosure. It follows that a primary object of the invention is to provide a novel and improved wall rack and end gate enclosure for pick-up trucks to adapt such trucks for stock carrying purposes.

The ordinary pick-up truck, of the style above referred to, comprises, generally, a light-weight truck having a flat bed, behind the cab, which is about six feet wide and nine to twelve feet long. This bed is enclosed by a front wall, sidewalls and a tail gate each of which is about a foot high, although the front wall behind the cab of the truck often extends to the top of the cab. This truck has many and varied uses, and when used on a farm or ranch it is especially useful for carrying small numbers of stock to or from market. When so used, its structure is modified by providing sidewall stock racks and an end gate enclosure to contain the animals.

The loading of stock into a pick-up truck so modified is ordinarily accomplished by opening the end gate and tail gate and backing the truck against the door of a railway car or receiving chute so that the stock may be directed and prodded into the truck with a minimum of effort. The truck is then pulled away from the car or chute and the gates closed. In this operation extreme care must be taken, or frightened, half-wild stock will escape from the truck before the truck is moved far enough to permit the end gate to be closed. It follows that two and even three men must participate in such a loading operation, and even then stock will escape from the truck before the gate can be closed.

Where many loading operations are made, the problem of getting the truck away from a car or chute and closing the end gate without stock escaping becomes important, and with this problem in view, the present invention was conceived and developed, and comprises, in essence, a stock carrying structure for a pick-up truck having sidewall stock racks and an end gate adapted to be moved upwardly between the stock racks and overhead out of the way when a loading operation commences, but which may be dropped into position for closure without the necessity of moving the truck away from a loading car or chute.

Further objects of the invention are to provide a novel and improved stock-carrying structure for a pick-up truck which: (a) simplifies the loading operation by permitting a closure of the end gate before the truck moves away from the loading car or chute and thereby eliminates the need for extra help in getting the truck away from the chute while preventing escape of the animal; (b) provides an end gate which will stand over the truck tail gate when closing the structure, and which will be lifted over the structure to completely open the end, or even be quickly and completely removed from the structure whenever the truck is to be used for purposes other than carrying stock; (c) provides a simple means for carrying the end gate between the sidewall stock racks; (d) provides an improved latch element for holding the gate above the structure in open position; and (e) provides a neat, simply constructed, economical, rugged and durable unit.

With the foregoing and other objects in view, all of which more fully hereinafter appear, my invention comprises certain novel constructions, combinations and arrangements of parts and elements as herein described, and as defined in the appended claims, and illustrated in preferred embodiment, in the accompanying drawing, in which:

Figure 1 is a rear perspective view of a pick-up truck, with my improved stock-carrying structure mounted thereon and with the end gate thereof in a closed position.

Figure 2 is an isometric view of a fragmentary portion of the truck body and stock carrying structure as taken substantially from the indicated line 2—2 at Fig. 1.

Figure 3 is an isometric view of a smaller fragmentary portion of the showing at Fig. 2, as from the indicated arrow 3 at Fig. 2, but on an enlarged scale and with portions of elements broken away to show parts otherwise hidden from view.

Figure 4 is a fragmentary elevation view of a latching element as from the indicated arrow 4 at Fig. 2, but on an enlarged scale and with broken lines indicating alternate positions of the latch and with a gate element in position for latching.

Figure 5 is a fragmentary sectional view as taken on the indicated line 5—5 at Fig. 4.

Referring more particularly to the drawing, the pick-up truck T is an ordinary light-weight truck whose body frame 11 is conventionally mounted upon wheels 12 with an operator's cab 13 and motor hood 14 at the front end thereof and with the flat rectangular bed 15 rearwardly of the operator's cab. This bed 15 is circumscribed by a transverse front endwall 16, sidewalls 17 and a rear tail gate 18 to form a flat box-like unit. The front endwall, as shown, upstands behind the operator's cab 13 the full height of the cab with a viewing opening 19 therein, although other types of front walls may be used. The sidewalls 17, which ordinarily stand about a foot high, extend along each side edge of the bed 15 and are unbroken except for hooded recesses 20 which are necessary in those models of trucks where the bed is below the top of the rear wheels 12. The tail gate 18 is ordinarily the same height as the sidewalls 17 and is hinged along its bottom edge to the end of the bed 15 as by hinges 21 to permit it to be dropped to open the rear end of the bed. Latches 22 are positioned at the corners between the tail gate 18 and sidewalls 17 to permit the end gate to be locked in closed position.

The improved stock carrying structure S is adapted to extend the sidewalls 17 and tail gate 18 upwardly to provide a complete enclosure for carrying stock such as horses and cattle. A stock rack 23 upstands from each sidewall 17, and is preferably formed as a lattice including upstanding posts 24 interconnected by horizontal rails 25. This rack 23 is ordinarily attached to the sidewall 17 by fitting the bottom ends of the posts 24 into sockets 26 on the sidewall 17. The structure may be varied from the showing in any desired manner providing that the inner face of each rack constitutes upstanding wall portions in spaced parallelism with the opposing rack inner face whereto elements forming the gate structure 27 may be engaged as hereinafter described.

The gate structure 27 is somewhat similar in form to an ordinary overhead door and is mounted in and between a pair of U-shaped tracks 28 on each sidewall rack 23. Each track upstands from the truck bed above a corner at a sidewall and end gate juncture, alongside the terminal post 24' of the rack 23, and extends to the top of the post. Thence, the track turns to lie horizontally and extend forwardly alongside the top rack rail 25' to terminate at an end 28' at its forward end which provides a stop means for the forward gate movement. Each track is fastened to the terminal post 24' and top rail 25' by any suitable means as welds 29 at suitable intervals. The troughs of these U-shaped tracks lie in mutual opposition so that the end gate panels 30a and 30b may be mounted therein with their ends or edge elements slidably positioned in the troughs.

The gate 30 comprises a plurality of rectangular panels here illustrated as two, namely, 30a and 30b, which are interconnected in tandem, here illustrated with panel 30a above the other, 30b. Each panel is formed by transverse and upright lightweight tubular members, including in this embodiment, a top horizontally-disposed transverse member 31, an intermediate transverse member 32 which lies in spaced parallelism with the member 31, a bottom transverse member 33 which lies in spaced parallelism with the member 31, and a pair of upright end members 34 which lie between the top and bottom members a short distance from the ends thereof. The intermediate transverse member 32 is adapted to lie between the upright members 34 and, accordingly, is shorter than the top and bottom members, all as clearly illustrated in the drawing. The extension of each end of the top member 31 and bottom member 33 beyond the upright members forms a finger 35 which lies in the trough of a track 28 and it follows that such fingers hold the panel between the tracks, yet permit it to be raised, from the upright position with the gate closed, to follow the track around the turn at the top of the terminal post 24' to lie flatly above the sidewall rack structures 23 in an open position.

The panels 30a and 30b are interconnected in tandem by links 36 which are formed as elongated O's to encompass the lower transverse member 33 of the upper panel and adjacent upper transverse member 31 of the lower panel with a loose fit so that a hinging action may occur about either member 33 or member 31 and this double hinging action will permit one panel to rotate or shift slightly out of the plane of the other panel. Two links 36 are adequate, a link being positioned along the inner side of each end member 34 being sufficient to hold the panels together.

In operation, the gate 30 is shifted from the closed position, across the end of the truck above the tail gate 18 to an open position above the side racks 23, and it is often describe to lock the gate 30 in such open position when the truck is being used for purposes other than carrying or when loading or unloading stock. To accomplish this, an improved, automatically-operable latch 37 is mounted upon each track 28 immediately above the turn at the top of the terminal post 24'. The base 38 of each latch 37, which is attached to the top of the track 28, carries a pivot pin 39 whence a triangular pendant 40 depends to swingably lie in a plane parallel with the direction of the gate movement. The pendant 40 is proportioned similar to an isosceles triangle with the pivot 39 at the apex and with the base normally extending below the track 28 so that movement of the gate 30 therepast will swing the pendant out of the way as indicated by the position A shown in broken lines at Fig. 4.

A detent 42 extends beyond the forward corner of the base edge 41 which is adapted to latch the pendant upon any transverse-member-finger 35, which does not continue to move forward out of the reach of the pendant, as clearly shown by the position B, in dot-dash broken lines at Fig. 4. It is anticipated that the length of the portion of track 28 lying alongside the top rack rail 25' is such as the finger 35 of the lower transverse member 33 of the bottom panel 30b will stop at the position indicated at Fig. 4 when the gate is fully open, and that the gate will normally be held in a locked open position.

Unlocking can be accomplished by simply swinging the pendant over its pivot to the normal hanging position which then permits it to be shifted out of the way by the fingers of the gate moving therepast.

A further feature of the organization lies in the provision of quick and easy removal of the gate from the tracks to arrange the pick-up truck T for other uses than carrying stock, in which the gate would be in the way, as in the hauling of tall objects. There is provided an opening 43 in the top edge of each track 28 at the forward end of the portion lying alongside the top-rack rail 25'. The fingers 35 of each transverse member of each panel may be lifted from the track through these openings 43 in an ordinary sequence to effectuate the gate removal or a reversal of this operation for reinstallation of the gate for stock carrying use. The links 36, which are formed as elongated O's to permit a double hinging action between the panels 30a and 30b, facilitate the removal of the panels from the tracks. When the gate is moved to the top of the track, the fingers 35 of the upper transverse member 31 of the top panel 30a are lifted out of the track through openings 43. This panel is then rotated about its lower transverse member 33 to any suitable position above the track and the gate is shifted to position for removal of the fingers 35 of said member 33 through openings 43. As these fingers are removed, the rotation of the unit is about the upper transverse member 31 of the lower panel 30b. Subsequent shifting and removal of fingers 35 of said lower panel transverse member 31 through openings 43 is then effected. Further shifting and removal of the fingers 35 of the lower transverse member 33 of the lower panel 30b completes removal of the gate.

While I have described in great detail the constructions and arrangements of the elements constituting my invention, it is obvious that others skilled in the art can devise and build alternate and equivalent constructions which are within the scope and spirit of my invention; hence, it is my desire that my protection be limited not to the details illustrated and described but only by the proper scope of the appended claims.

I claim:

1. A stock carrying body structure for a pick-up truck of the type having a flat bed behind the truck cab enclosed by relatively low sidewalls and a relatively low, outwardly-swingable tail gate, and the like, and including a pair of sidewall stock racks upstanding from the truck sidewalls as a continuation thereof, a pair of spaced, inwardly-facing tracks carried by the sidewall stock racks with each track extending upwardly from the rear lower corner of a rack to the top of the rack and thence forwardly along the top portion of the rack, an end gate formed as a plurality of hingedly interconnected panels including a top panel and a bottom panel and horizontally axised hinged connections between adjacent panels, each panel having extended fingers at each side thereof adapted to channel with and slideably engage the tracks whereby to hold the end gate in an upstanding position above the tail gate as a continuation thereof when the gates are closed and to permit the end gate to move upwardly to the top of the racks and forwardly to a flat position along the top portion of the racks when the gate is opened, said fingers being positioned at the top of the top panel, bottom of the bottom panel and at a hinge axis at each panel interconnection and an opening at the top of each track wherethrough said fingers are adapted to be moved to remove the gate from the tracks.

2. In a stock carrying body structure for a truck adapted to be mounted upon the truck bed behind the cab thereof having side walls, a pair of spaced, inwardly facing tracks carried by the side walls with each track extending upwardly from the rear lower corner of a side wall to the top thereof and thence forwardly along the top portion thereof, stop means at the forward end of the track and an end gate having extended fingers at each side thereof adapted to channel with and slidably engage the tracks whereby to hold the gate in an upstanding closed positon at the rear of the walls and to permit the gate to move upwardly to the top of the walls and forwardly to a flat position along the top portion thereof and against the stop means when the gate is open and including a pendant pivotally mounted above the track with a base edge below the track and a detent depending from the forward side thereof below the base edge said pendant being located along the track with respect to the location of a finger on the gate; whereby forward movement of the finger past the pendant reaches a point immediately beyond the pendant when the gate is opened and its forward movement stopped by said stop means and the pendant is lifted over the finger and dropped behind the finger with the detent resting upon the finger and holding the base of the pendant across the track and against the finger whereby to prevent a reversal of movement of the gate.

3. A stock carrying body structure for a pick-up truck of the type having a flat bed behind the truck cab enclosed by relatively low sidewalls and a relatively low, outwardly-swingable tail gate and the like, and including a pair of sidewall stock racks upstanding from the truck sidewalls as a continuation thereof, a pair of spaced, inwardly-facing tracks carried by the sidewall stock racks with each track extending upwardly from the rear lower corner of a rack to the top of the rack and thence forwardly along the top portion of the rack, stop means at the forward end of the track, an end gate having extended fingers at each side thereof adapted to channel with and slidably engage the tracks whereby to hold the end gate in an upstanding position above the tail gate as a continuation thereof when the gates are closed and to permit the end gate to move upwardly to the top of the racks and forwardly to a flat position along the top portion of the racks and against the stop means when the gate is opened, and a pendant pivotally mounted above the track with a base edge below the track and a detent depending from the forward side thereof below the base edge, said pendant being located along the track with respect to the location of a finger on the gate whereby the forward movement of the finger past the pendant reaches a point immediately beyond the pendant when the gate is opened and its forward movement stopped by said stop means and the pendant is lifted over the finger and dropped behind the finger with the detent resting upon the finger and holding the base of the pendant across the track and against the finger whereby to prevent a reversal of movement of the gate.

References Cited in the file of this patent

UNITED STATES PATENTS

| | | |
|---|---|---|
| 658,365 | Hardy | Sept. 25, 1900 |
| 1,530,428 | Sines | Mar. 17, 1925 |
| 1,729,825 | Gaiser | Oct. 1, 1929 |
| 1,857,756 | Headley | May 10, 1932 |
| 2,322,088 | Black | June 15, 1943 |
| 2,543,143 | Wells et al. | Feb. 27, 1951 |
| 2,720,414 | Hart | Oct. 11, 1955 |